Patented Oct. 9, 1951

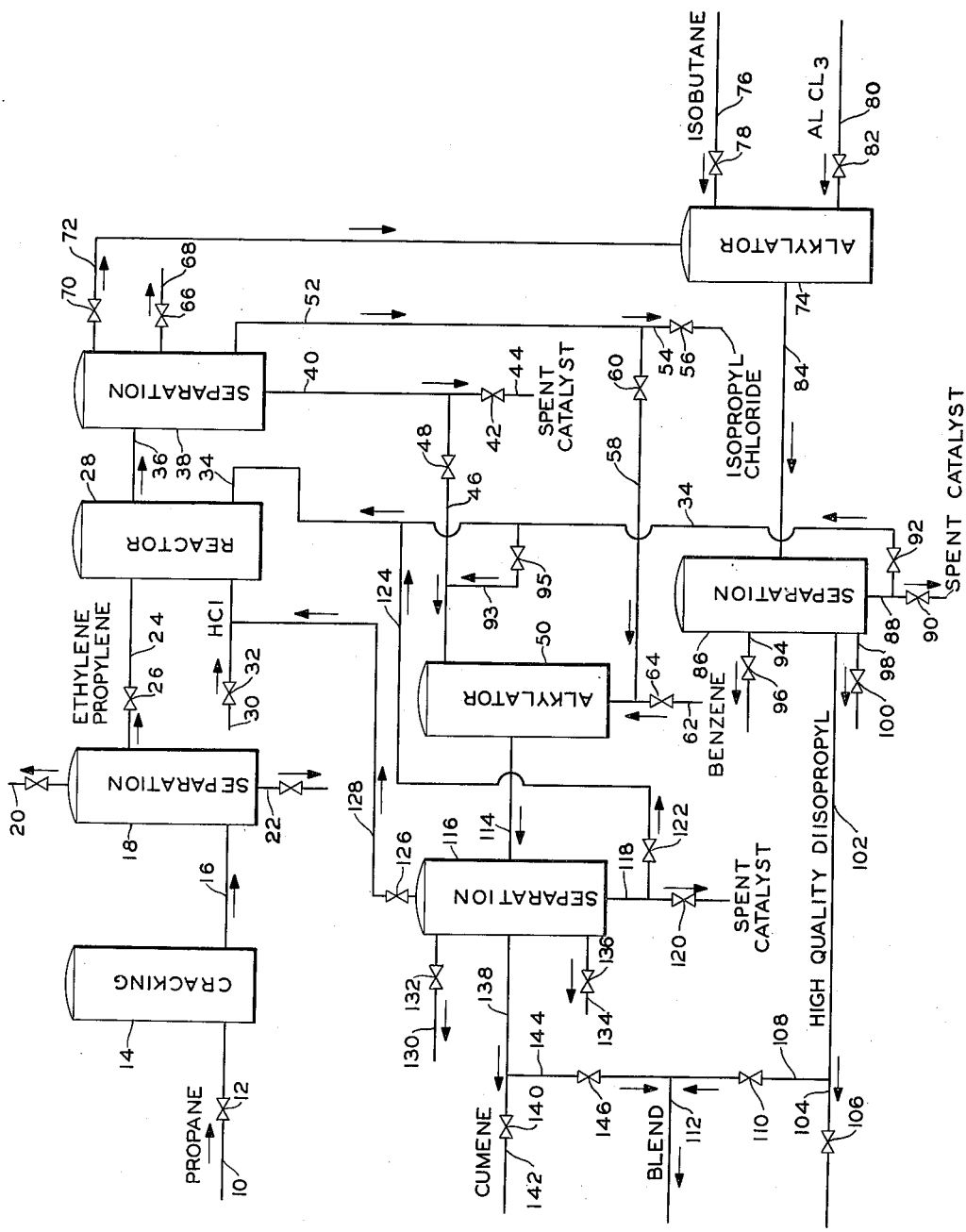

2,570,407

UNITED STATES PATENT OFFICE 2,570,407

REACTIONS INVOLVING THE USE OF HYDROGEN HALIDES

John D. Upham, Bartlesville, Okla., assignor to Phillips Petroleum Company, a corporation of Delaware Application January 5, 1948, Serial No. 604

5 Claims. (Cl. 260—671)

1

This invention relates to the use of hydrogen halides in the reactions of organic materials. In one specific embodiment the invention pertains to the use of a mixture of olefins in hydrocarbon conversion processes wherein the mixture is purified in a first reaction with a formation of alkyl halides as valuable products and the thus-purified olefin is then used in a second reaction with the formation of additional valuable products. In one of its specific aspects the invention relates to the alkylation of isoparaffins or other alkylatable hydrocarbons with ethylene in the presence of a Friedel-Crafts type metal halide catalyst promoted by the corresponding hydrogen halide in minor amounts. In another specific aspect it relates to the formation of alkyl halides by reaction of a hydrogen halide with a mixture of olefins at selected conditions. A further specific aspect of the invention pertains to the production of high quality aviation fuels by catalytic alkylation processes.

It is well known that in many organic chemical reactions the purity of the product is often dependent on the purity of the reactants. The commercial processes involving alkylation of hydrocarbons with olefins are examples. For instance, when alkylating isobutane with a specific olefin such as ethylene to produce a high octane number motor fuel, which is composed largely of the primaryl alkylation product 2,3-dimethylbutane (diisopropyl), the ideal situation would be to have practically pure ethylene as an olefin feed stock. However, it is often commercially unfeasible to attempt the complete removal of propylene, which is the olefin usually contaminating the ethylene, hence a compromise must be made between the octane number of the final product and the expense or difficulty of obtaining a clean-cut separation of ethylene from an ethylene-propylene stream. It is customary to leave small amounts of propylene in the ethylene, ranging up to 10 or even 20 or 25 per cent of the total olefin, but this is done at the expense of octane number of the alkylate product and also at the expense of increased catalyst consumption caused by the presence of propylene in the reaction mixture.

The diisopropyl alkylate referred to above not only has one of the highest octane numbers of any of the isoparaffinic hydrocarbons, but is also extremely valuable in that its octane number is high not only under the usual conditions of "lean mixture" in aircraft engines, but also under "rich mixture" conditions; it also has particularly valuable volatility characteristics for use in aviation fuels. The trend in the design of internal combustion engines for aircraft has been toward those of higher power output and in pace with this trend fuels having 100 octane number antiknock rating and higher have been developed and are in common use. This trend is largely explained by the desire to increase the power of airplane engines with concomitant increase in ceiling, rate of climb, top speed, and increased take-off power at shorter distances. Such fuels have the further advantage of lower specific fuel consumption thus permitting a substantial increase in flying range or a decrease in fuel loads required for a given range. Recent experience has taught the importance of using fuels which have a uniformly high octane number under the various conditions of operation, and that fuels which have a suitable octane rating under normal "lean mixture" cruising operations may be more or less unsuitable and possess too low an octane number under "rich mixture" conditions such as are essential for optimum take-off performance, maximum rate of climb, etc. The terms "lean mixture" and "rich mixture" refer to the proportions of fuel in air in the explosive mixture fed to the cylinders, the lean mixture of course having the lower fuel:air ratio.

The incorporation of materials which will give high octane ratings under both "lean mixture" and "rich mixture" conditions is therefore a primary requisite of an aviation fuel particularly for military purposes. Diisopropyl is such a material. Alkylated aromatic hydrocarbons are also highly desirable from the standpoint of "rich mixture" characteristics, though the percentage of aromatic hydrocarbons permissible in a total aviation gasoline is somewhat limited. A specific alkylated aromatic hydrocarbon which has been widely used and which is a preferred component of aviation gasoline is cumene, i. e. isopropyl benzene. Cumene in combination with diisopropyl provides an exceptionally satisfactory fuel of balanced "lean mixture" and "rich mixture" characteristics and of desirable volatility characteristics, as disclosed in the copending patent application of S. C. Carney and the present inventor, Serial No. 514,690, filed December 17, 1943, and now abandoned. The blend of cumene and diisopropyl may be used as a fuel as such with only isopentane added, but ordinarily is blended with a conventional high octane number alkylate such as produced by the alkylation of isobutane with $C_4$ and $C_5$ olefins. Cumene is ordinarily also obtained by an alkylation reaction, usually the alkylation of benzene with propylene in the presence of a Friedel-Crafts type metal halide catalyst such as aluminum chloride or other known aromatics-alkylation catalysts.

Ordinarily in the manufacture of diisopropyl a liquid aluminum chloride-hydrocarbon complex is utilized as catalyst. This complex is intimately contacted with a liquid hydrocarbon reaction mixture comprising ethylene in admixture with a large excess of isobutane, and the resulting emulsion is passed from the reaction zone to a settling zone for separation of catalyst and hydrocarbon phases. The hydrocarbon phase is passed to separating means for recovery of various products and recycle components, while the catalyst phase is continuously returned to the reactor in a closed circuit. In order to maintain the activity of catalyst at a substantially constant and optimum level, fresh active catalyst must be continuously or intermittently added to the body of circulating catalyst. A corresponding amount of this body of circulating catalyst must be withdrawn to maintain a constant catalyst volume. The catalyst so withdrawn is usually termed "spent" catalyst but is actually just as active as the total body of catalyst being used in the alkylation system. Heretofore no practical use for this "spent" catalyst has been known and the amount of aluminum chloride discarded as "spent" catalyst in a commercial plant reaches staggering proportions. Thus, in one plant producing from 60,000 to 70,000 gallons of diisopropyl per day, 3000 to 4000 pounds per day of aluminum chloride are discarded in the form of complex withdrawn as "spent" catalyst. In view of the initial cost of the catalyst and its scarcity this represents a large economic waste.

Similar problems are encountered in the preparation of cumene or other alkylated aromatic hydrocarbons when aluminum chloride complexes or other Friedel-Crafts type catalysts are employed in the alkylation of benzene with propylene, for instance. Instead of propylene, isopropyl chloride may be used as the alkylating reactant, with aluminum chloride being the catalyst. Such isopropyl chloride may be derived from any source, but a convenient method of preparation is the reaction of hydrogen chloride with propylene.

In the last named reaction, viz. HCl plus propylene to give isopropyl chloride, a variety of catalysts may be employed. Aluminum chloride, because of its commercial availability and the knowledge of commercial techniques which has been acquired with respect to the use of this catalyst, would be a very desirable catalyst to use, but ordinary aluminum chloride or its complexes with hydrocarbons or other organic materials is too active for entire satisfaction. Incorporation of added materials designed to reduce the catalyst activity would usually involve an economic waste of the relatively expensive aluminum chloride.

It is an object of this invention to overcome defects mentioned above in the various reactions and processes discussed.

Another object of the invention is to provide an integrated process for the manufacture of aviation fuel employing propylene and ethylene as raw materials.

A further object is to provide an improved control of reaction conditions and the composition of material streams in a process involving the segregation of pure ethylene from a mixed olefin stream and utilization of the pure ethylene in the alkylation of isobutane in the presence of aluminum chloride activated with a small quantity of hydrogen chloride to form diisopropyl.

Yet another object of the invention is to improve the utilization of catalyst in processes of the nature described.

Yet a further object of the invention is to manufacture cumene for use in aviation fuel by the alkylation of benzene with isopropyl chloride in the presence of a Friedel-Crafts type metal halide catalyst of modified and controlled active.

Another object of the invention is to improve the separation of propylene from ethylene.

Yet another object is to selectively react propylene in an ethylenepropylene stream with anhydrous hydrogen chloride in the presence of an aluminum chloride catalyst of diminished and controlled activity under conditions giving a high degree of selectivity.

A further object of the invention is to provide a stream of ethylene containing an exactly controlled minor quantity of hydrogen chloride as promoter for the aluminum chloride catalyst used in the reaction of said ethylene with isobutane to form diisopropyl.

Further objects and advantages of the invention will be apparent, to one skilled in the art, from the accompanying disclosure and discussion.

In one preferred embodiment of my invention a gas comprising a mixture of ethylene and propylene and obtained from any source, such as by cracking propane, is admixed with a carefully controlled quantity of gaseous anhydrous hydrogen chloride. The admixture is contacted with an aluminum chloride catalyst which will be described in detail later on, under conditions effecting the selective reaction of hydrogen chloride with propylene leaving ethylene substantially unreacted and producing an effluent containing ethylene plus a residual but definite and specific quantity of hydrogen chloride. This effluent is subjected to separation steps for the removal of isopropyl chloride product, and in this separation procedure there is produced by fractional distillation a single gaseous fraction containing the ethylene which went through the reaction without being reacted plus the aforesaid quantity of residual hydrogen chloride. This gaseous stream is next passed to contact with isobutane and a fresh aluminum chloride catalyst, preferably in the form of a complex with hydrocarbons, under alkylation conditions to form a diisopropyl alkylate of highest quality. The hydrogen chloride thus introduced into the alkylation reaction in the ethylene stream serves as activator for the aluminum chloride catalyst in the alkylation reaction, and the amount of HCl thus introduced to the alkylation as activator is regulated by the control of the amount of HCl initially introduced into the ethylene-propylene stream as described above prior to the isopropyl chloride-forming reaction. By the careful correlation of the amount of HCl thus initially introduced, with respect to the propylene content of the feed and the reaction conditions employed in the isopropyl chloride-forming reaction, the exact amount of HCl needed as catalyst activator is obtained in the pure ethylene stream fed to the diisopropyl-forming reaction.

The catalyst used to effect the reaction of HCl with propylene is preferably "spent" alkylation catalyst obtained from the diisopropyl-producing step itself. By use of this catalyst together with the control of the HCl content of the feed so that it is just slightly greater than that required to react to the propylene content of the feed stream, all or substantially all of the propylene is converted to isopropyl chloride while substantially no ethylene is reacted. This is easily accomplished in my process (1) because only a slight excess of HCl is present, (2) because of the much greater reactivity of propylene toward HCl than that of ethylene toward HCl, and (3) because of the decreased and modified activity of the catalyst as compared with fresh aluminum chloride.

The isopropyl chloride formed by this process is a valuable product, useful per se, or as an intermediate in many chemical syntheses. Ordinarily little or no normal propyl chloride is formed, though any such normal propyl chloride can be separated from the isopropyl chloride for use as desired or in some instances the mixed propyl chlorides are utilizable together. Processes for separating propylene from ethylene in order to produce ethylene of sufficient purity for use in alkylation or otherwise, usually involve the destruction of the propylene or its conversion to materials of little or no value. In contrast my process forms the valuable propyl chloride or chlorides which are known articles of commerce having many uses either in reactions for producing other valuable products, or for use as solvents and the like without alteration.

If desired, the isopropyl chloride so produced may be used as an alkylating reactant in a separate reaction with isobutane or with other alkylatable paraffinic hydrocarbons in known manner to form further amounts of high octane number motor fuel constituents. A preferred modification of my invention utilizes the isopropyl chloride to react with benzene to form cumene (isopropyl benzene), and this cumene is then blended with the diisopropyl formed in the ethylene-isobutane reaction, forming a high octane number blending stock having exceptionally high "rich mixture" as well as "lean mixture" anti-knock qualities. In the cumene-producing step, I prefer to use catalyst from the diisopropyl-producing step or from the isopropyl chloride-producing step, preferably the former in which case the catalyst is finally passed to the isopropyl chloride-producing step after use in the aromatic alkylation which produces cumene. In the latter method of proceeding, I also prefer to pass a small part of the spent catalyst, which is relatively rich in HCl, from the isopropyl chloride-producing step into the aromatic alkylation, at least at the start of the latter reaction, to supply sufficient HCl for good initial conversion, as well as to recover any isopropyl chloride absorbed in such catalyst by reacting such absorbed isopropyl chloride with benzene to produce further quantities of cumene. Alternatively, when the reaction conditions are such that substantial amounts of isopropyl chloride are present in the catalyst removed from the propylene-HCl reaction, then the benzene-isopropyl chloride reaction is preferably effected in the presence of a catalyst taken from the propylene-HCl reaction rather than from the diisopropyl-producing reaction, whereby isopropyl chloride from the catalyst is effectively utilized as a reactant.

In order to illustrate and exemplify my invention in further detail the accompanying drawing is provided in which is shown one arrangement of apparatus elements and flow of materials therethrough by which my invention may be practiced in a preferred form. It will be appreciated that this is only a schematic representation and that many additional pieces of equipment required for the actual carrying out of the process, such as valves, controls, heat exchangers, fractionating columns, pumps, etc., will be readily supplied by one skilled in the art in view of the instant disclosure.

In the drawing, propane, preferably admixed with ethane, is passed through line 10 and valve 12 into a non-catalytic cracking unit 14 wherein it is cracked at a low pressure of the order of 5 to 30 pounds per square inch and at a temperature in the range of about 1200 to 1600° F. and preferably of 1250 to 1450° F., for a time sufficient to produce high yields of ethylene and propylene by cracking and dehydrogenation. The resulting cracked material is passed through line 16 to separating means indicated diagrammatically by unit 18 in which a fraction containing ethylene and propylene is separated from methane and hydrogen, which are removed through conduit 20, and from hydrocarbons having four or more carbon atoms per molecule which are removed through conduit 22. The separation may be accomplished in known manner; for example the total cracked gas is cooled and passed through a three-stage scrubber system for removal of small amounts of aromatic oils and then to a fractionator which removes 4-carbon-atom hydrocarbons and heavier. The overhead in this fractionator is then contacted with a catalyst which selectively removes acetylene, such as by selective hydrogenation. The process thus far may be carried out in a manner similar to that disclosed in U. S. Patent 2,320,127 by Karl H. Hachmuth and hence need not be further described in detail here. The gas so obtained in one particular instance has the following composition:

| | Mol Percent |
|---|---|
| Hydrogen | 15.3 |
| Methane | 32.0 |
| Ethylene | 28.4 |
| Ethane | 12.2 |
| Propylene | 8.4 |
| Propane | 3.7 |
| | 100.0 |

If it is desired to remove a part of the propylene before passing to the first reaction step of my process this may be done by passing the gas just described to an oil absorption step under conditions such that about 50 to about 95 per cent of the propylene is removed; however such a step is ordinarily not utilized but the first reaction step is relied on to remove all the propylene from the ethylene. It is also possible to remove the propylene and/or the ethylene by selective absorption from the paraffinic and other non-olefinic materials present but this also is seldom necessary. If desired, an ethane-propane mixture which may contain small amounts of propylene may be recovered and recycled to the cracking unit 14 for further conversion of the paraffins to ethylene. Such a material can be recovered by stripping a rich absorption oil used to remove part of the propylene from the ethylene. In any event, the gas containing both ethylene and propylene is recovered through line 24 containing valve 26 and is thereby passed into the reactor 28 which represents diagrammatically the first reaction step of my process.

As a source of olefinic reactants a wide variety of gas mixtures may be used in carrying out the present invention. Generally the most readily available gas mixtures will be those obtained as a by-product of the cracking of heavy oils to produce motor fuel, or those obtained by the catalytic or non-catalytic cracking and/or dehydrogenation of gaseous paraffins. Particular reference has been made in the drawing to a gas formed by the non-catalytic cracking of propane to produce high yields of ethylene and propylene. However, it will be seen that the same principles may be applied to olefinic gases from other sources.

In carrying out the formation of the desired components of aviation gasoline by alkylation, it is highly important that the olefin used in the alkylation step be as pure as possible so that high yields of the specific hydrocarbon are obtained. This not only insures an economic use of raw materials but also simplifies ultimate separation steps and provides products substantially uncontaminated with by-products of lower octane number or other undesirable characteristics. The preliminary purifying treatment in separation unit 18 substantially removes all the 4-carbon-atom and heavier material from the gas. The thus-purified gas is contacted in reactor 28 with controlled quantities of a hydrogen halide, preferably hydrogen chloride, introduced via line 30 and valve 32. Preferably the reaction is carried out in the presence of a catalyst, and the preferred catalyst is an aluminum chloride-hydrocarbon complex which has already been used in other stages of the process as will appear more fully hereinafter. The setting of valves 26 and 32 is carefully controlled and regulated, so that with due regard to the specific reaction conditions maintained in reactor 28 there will be sufficient HCl to react with most or all of the propylene together with a limited excess thereover which will appear unreacted in the effluent from the reactor. The regulation is effected so that the unreacted HCl in the effluent is of the quantity desired for use later in the second reaction step.

Reaction of HCl with propylene may be effected, in the case of an aluminum chloride complex, at substantially atmospheric temperatures, and the catalyst and reactants may be contacted in any suitable manner. One method is to allow the liquid catalyst to flow downwardly through a tower containing packed material insuring intimate gas-liquid contact, and pass the total gaseous reaction mixture upwardly therethrough. Alternatively, the reaction may be effected at sufficient pressure and preferably in the presence of added liquid inert diluent to maintain substantially liquid phase conditions and the catalyst and liquid reaction mixture may be contacted intimately by vigorous stirring or otherwise in a manner similar to that used in the second reaction stage of the process in which an alkylation reaction is effected. If desired, the catalyst may be supported on inert supporting materials, but the most convenient method is usually to flow the liquid catalyst over inert contact material. Sufficient reaction time is allowed to give desired selective reaction of HCl with propylene while avoiding reaction of HCl with ethylene, the exact time of course depending on the method of contacting the reactants with the catalyst, the activity of the particular catalyst used, the concentration of each olefin in the reaction mixture, and the quantity of diluent, if any is present. If conditions are such that it is desired to recover liquid isopropyl chloride, the reaction if carried out at substantially atmospheric pressures will be effected at temperatures below about 35° C., and preferably near 0° C. In some cases isopropyl chloride products may be used as a suspending medium for the catalyst. Alternatively, an essentially gas phase reaction may be effected whereby not only the reactants but also the product are in vapor form and in this event temperatures above the boiling point of the product at the particular pressures used will be employed, for instance above 35° C. at atmospheric pressure. The temperature may range on up to 100° C. or even higher provided a sufficiently short contact time is used, in the case of an aluminum chloride catalyst. In any event, the contact time for temperatures above 35° C. are considerably shorter than are those for the lower temperatures. Selection of suitable specific conditions of contact time, pressure and temperature for any given catalyst are well within the skill of the art and need not be given in further detail here. The reaction can be carried out non-catalytically, by using pressures of 200 to 300 pounds per square inch or higher at moderately elevated temperatures, but this is not so selective nor desirable. In any event there will be a small amount of ethylene reacted and there will be a slight amount of propylene unreacted. However, because of the limitation of HCl content, the amount of ethylene reacted can be maintained at a practically negligible value. Furthermore, by using a spent alkylation catalyst as described herein the catalytic activity may be maintained sufficiently low, as compared with the use of fresh aluminum chloride, that the selectivity of the reaction between ethylene and propylene is high and practically no ethylene is reacted. Catalysts other than aluminum chloride may be used, for instance stannic chloride, bismuth chloride, antimony halides, and others known to the art. Whatever catalyst is used may be introduced through line 34, which in the drawing shows a spent alkylation catalyst passing through that line into reactor 28.

Total reaction products, including the catalyst when desired, may be removed from reactor 28 through line 36 and passed into separation zone or zones indicated diagrammatically by unit 38, wherein a separation is made among the various components of the mixture. When a liquid catalyst is used, the same may be recovered through line 40. It will be understood of course that a part of such catalyst may be recycled to reactor 28 by means not shown. The "spent" catalyst thus withdrawn may be partly or entirely withdrawn from the system through valve 42 and line 44, or part of it may be passed via line 46 and valve 48 into the aromatic alkylation zone indicated diagrammatically by unit 50, which will be described in more detail hereinbelow. Propyl chloride product is recovered through line 52 and may be passed via line 54 and valve 56 to storage for future use as such or as a chemical intermediate, and part or all may be passed through line 58 and valve 60 into alkylation zone 50 to react therein with benzene or other aromatic hydrocarbon which is introduced through line 62 and valve 64. Further description of this portion of the process will be given later. Undesired light and/or heavy materials may be discarded from separation unit 38 by way of valve 66 and line 68. There is also recovered from separation unit 38 a material which contains all of the unreacted ethylene plus the controlled small quantity of hydrogen chloride which passes through reactor 28 unreacted, and this mixed material is recovered via valve 70 and line 72 and passed thereby into alkylation zone 74 wherein the ethylene reacts with isobutane and the hydrogen chloride acts as activator for the aluminum chloride catalyst. The isobutane is introduced into the alkylator 74 by way of line 76 and valve 78 while the aluminum chloride catalyst is introduced by way of line 80 and valve 82. Separation unit 38 may involve the use of various items of equipment and procedures which will be well understood to those skilled in the art. Preferably the HCl-ethylene fraction recovered through line 72 is prepared as a single gas fraction by fractional distillation and/or simple gas flashing. This is readily accomplished because of the closeness of boiling point of ethylene and hydrogen chloride and by virtue of the fact that no other components of the reaction mixture passed into separation zone 38 boil near these materials except ethane and propane; these paraffinic gases may accompany the ethylene and hydrogen chloride in the single gas fraction, as they are innocuous in the alkylation reaction effected in unit 74.

In alkylator 74, which is a diagrammatic representation of the usual equipment for effecting the desired reaction, isobutane or other low-boiling alkylatable paraffin hydrocarbon such as isopentane is alkylated with ethylene in the presence of an aluminum chloride catalyst activated by small amounts of hydrogen chloride. The reactor employed in unit 74 is of any type which provides adequate mixing and contact of liquid hydrocarbon reactants with catalyst. A mechanically stirred reactor is suitable but other kinds are also useable. In the reactor an emulsion of liquid catalyst and liquid hydrocarbon is formed and maintained for a suitable reaction period to convert almost but not quite all of the ethylene in the reaction mixture to form normally liquid high octane number isoparaffins, principally diisopropyl when isobutane is alkylated. One or a series of reactors may be used and the ethylene may be introduced into each reactor in a series if desired. The emulsion is withdrawn continuously from the reactor and passed to one or more settlers wherein the catalyst is readily settled from the liquid hydrocarbon material. The settled hydrocarbon reaction mixture is withdrawn from the settler and passed via line 84 to separating means indicated diagrammatically by unit 86, and which in ordinary practice comprises two or more fractionators with associated equipment. In order to control reaction temperatures the reactor may be provided with internal cooling coils or a portion of the hydrocarbon from the settler may be cooled externally and returned to the reactor. In the drawing the catalyst settler is indicated as comprising part of the equipment represented diagrammatically by separation means 86, and the catalyst as settled out is recovered as a heavy liquid phase via line 88 and valve 90 for discard from the system. A portion of this material is ordinarily recycled to the reactor by means not shown and in fact it is customary for practically all of the catalyst thus recovered to be recycled. A portion of the catalyst withdrawn from separator 86 may be passed via valve 92 and line 34 for use in the isopropyl chloride-forming reaction in reactor 28, and/or via line 93 and valve 95 for use in the cumene-forming reaction in reactor 50.

In separating means 86 unconverted excess isoparaffin is recovered as a low boiling product, for example through line 94 and valve 96, and recycled by means not shown to the alkylation reactor 74. Small amounts of light gases including unconverted ethylene are also recovered via line 94 or otherwise and returned by means not shown to suitable points in the system or discarded as desired. Small amounts of alkylate boiling above the aviation gasoline range are separated from unit 86 through line 98 and valve 100 as a high-boiling product, while the aviation fuel range alkylate from reactor 74 in which the alkymers comprise predominantly diisopropyl, is recovered through line 102. This diisopropyl product may be recovered and passed to storage through line 104 and valve 106, or it may be passed via line 108 and valve 110 into line 112 for admixture with cumene.

Aluminum chloride is the metal halide ordinarily used in the practice of my invention although other aluminum halides, especially aluminum bromide, are also efficacious. While aluminum fluoride generally does not give satisfactory results, mixed halides such as $AlCl_2F$, $AlClF_2$, $AlBr_2F$ and the like may often be used successfully. Other active halides of polyvalent metals or metalloids, generally known as metal halides of the Friedel-Crafts type, may also be used. Merely by way of example may be mentioned iron chloride; zirconium tetrachloride; tin tetrabromide; boron trifluoride and its complexes with water, phosphoric acid, organic acids, etc.; other metal halides of this type such as are well known to the art. The catalyst is promoted or activated by a small amount of hydrogen halide, the halogen of the hydrogen halide preferably being the same as the halogen of the metal halide catalyst. The amount required is quite small, and usually ranges from about 0.1 to about 1 to 5 per cent by weight of the metal halide. This does not ordinarily amount to more than about 1 per cent by weight of the total hydrocarbon material fed to the reactor, and is often less. In most cases the HCl feed ranges from 0.05 to 0.5 weight per cent of the total hydrocarbon feed. As explained hereinabove, the desired quantity of hydrogen chloride, which is the preferred hydrogen halide, is assured by control of the quantity of HCl initially supplied to the isopropyl chloride-forming reaction in unit 28 by way of line 30 and valve 32, the hydrogen chloride actually reaching alkylator 74 and used therein as catalyst activator being recovered through line 72 as unreacted hydrogen chloride from the isopropyl chloride-forming reaction in carefully controlled quantities. Any hydrogen halide which may be formed in alkylator 74 by virtue of slight amounts of water in the hydrocarbon feed thereto or by virtue of side reactions should be taken into account when calculating the total quantity of HCl needed as activator and therefore the quantity desired to be supplied through line 72.

The metal halide catalyst may be used as such, or suspended or dissolved in the reaction mixture. It may also be suspended on or impregnated onto solid supports such as active carbon, activated alumina, aluminous materials such as bauxite, active silica, kieselguhr, various clays such as fuller's earth, and other adsorptive or non-adsorptive solids known to the art. Or the metal halide may be used in the form of liquid complexes with organic or inorganic compounds. The preferred catalyst is aluminum chloride or other metal halide in the form of a liquid complex formed by reaction with a hydrocarbon material. The liquid hydrocarbon-aluminum chloride complexes preferably used in my process are generally prepared by reacting relatively pure and substantially anhydrous aluminum chloride with a paraffinic hydrocarbon fraction at a temperature between about 150 and 230° F. It is usually desirable although not essential to add during the formation of the catalyst a small amount of the corresponding hydrogen halide, and to mix the hydrocarbon and the aluminum halide vigorously until the resulting complex contains from about 40 to about 70 per cent by weight of aluminum chloride. Satisfactory fluid complexes may be prepared from a variety of paraffin hydrocarbons including, for example, normal heptane, isooctane, a paraffinic alkylate fraction resulting from reaction of isobutane with butylenes and boiling above 350° F., an olefinic polymer fraction boiling in the upper part of the gasoline range, or kerosene. The most highly branched paraffinic hydrocarbons seem to provide the most active catalyst. An essential requirement for the preparation of a good catalyst appears to be the use of a sufficiently powerful mixing to maintain the aluminum chloride and the hydrocarbon in intimate contact during the period the catalyst is being prepared. Two general types of catalyst have been prepared. These may be characterized as high-aluminum chloride and low-aluminum chloride types. When preparing a catalyst with aluminum chloride, the high-aluminum chloride type contains 80 to 85 per cent by weight of aluminum chloride and is a yellow highly viscous material; the low-aluminum chloride type contains about 55 per cent by weight of aluminum chloride, is a fluid red-brown oil having a viscosity less than 200 centistokes at 100° F., and is used as the actual catalyst. The high-aluminum chloride type can be added during a continuous run in small amounts to the recirculated catalyst in order to maintain catalyst activity. Catalyst activity, however, can be maintained in other ways as by adding aluminum chloride directly to recirculated catalyst or by dissolving aluminum chloride in one of the streams charged to the reaction zone. The liquid complex should not in any event be contaminated with water or other reactive, oxygen-containing compounds.

The catalyst above described is that used in the second reaction step of my process in which isopentane, benzene, or other alkylatable hydrocarbon, but preferably isobutane, is reacted with ethylene to produce primarily a mono-ethyl derivative. By ethyl or alkyl derivatives I mean to include whatever products appear to be the primary reaction products; thus diisopropyl is included as an ethyl derivative of isobutane even though it is not an "ethyl isobutane." The ultimate test as to whether or not the catalyst has suitable activity is to observe the amount of unreacted ethylene present in the reaction zone. This can generaly be accomplished by analyzing the effluent stream from the reaction zone since, with adequate mixing of the hydrocarbon reaction mixture and the catalyst in the zone, this effluent stream will have very nearly the same composition as the hydrocarbon phase in the reaction zone. It appears, however, that a rough estimation of the catalyst activity may be obtained by determining the heat evolved when water is added to a sample of the catalyst. When this test is made at room temperature a satisfactory catalyst will generally produce between about 275 and 330 calories per gram, preferably between about 310 and 330 calories per gram, when sufficient water has been added to effect complete reaction.

The catalyst itself is substantially insoluble in hydrocarbons and hydrocarbons are not substantially soluble in it. It is prefered to have a volume ratio of hydrocarbons to catalyst in the reaction zone between about 9:1 and about 1:1 and the preferred ratio has been found to be about 3:2. When the reaction mixture is maintained intimately admixed with the catalyst under the preferred conditions the hydrocarbon phase is the continuous phase and the catalyst phase is the discontinuous phase. Under these conditions the catalyst readily separates from the hydrocarbons and power requirements in order to maintain a suitable intimate admixture are not excessive. However, when a greater amount of catalyst is used, it has been found that a phase inversion may take place with the result that the catalyst phase is the continuous phase and the hydrocarbon phase the discontinuous phase, which is not nearly so satisfactory.

Under the prefered conditions adequate and intimate admixing of hydrocarbons and catalyst may be obtained by efficient stirrers, by injecting reactants into the reaction zone in jets with stream velocities of 50 to 500 feet per second, by turbulent flow conditions through a long tube coil, by intimately contacting hydrocarbons and catalysts concurrently or countercurrently in vertical towers containing suitable baffle elements, or by other suitable means.

A preferred reaction temperature for this conversion is between about 50 and about 200° F., preferably about 80 to about 150° F. When alkylating hydrocarbons the activity of the catalyst herein described is sufficiently high that ethylene undergoes rapid reaction within this temperature range. It is generally preferred to operate under a pressure such that the hydrocarbons are present in the reaction zone substantially in liquid phase and in many instances the hydrocarbon material will be kept in completely liquid phase under the preferred reaction conditions. The flow rate of reactants to the reaction zone is preferably expressed in terms of amount of product produced, and when reacting isobutane with ethylene to produce diisopropyl I prefer to operate at flow rates between about 0.2 and about 1.5 gallons of total alkylate produced per gallon of catalyst present in the reactor per hour. Thus, when reacting isobutane and ethylene in a reactor having a total internal volume of 1,000 gallons and with a hydrocarbon to catalyst ratio within the reactor of 3:2 and a flow rate of 1.25 gallons of alkylate per gallon of catalyst per hour, the feed flow rates should be such that 500 gallons of alkylate are produced per hour.

For highest alkylate quality consistent with a high rate of utilization of ethylene it is desirable to keep the ethylene concentration not greater than 2 or 3 mol per cent of the reactor effluent hydrocarbons. If ethylene utilization is less than that, i. e. if the reactor effluent contains more than about 2 mol per cent ethylene, the catalyst gets quite viscous probably because of ethylene polymerization and subsequent reaction with the complex. On the other hand, with too great an ethylene utilization the alkylate quality decreases due to disproportionation, isomerization and other side reactions affecting the alkylate because of the excessive reaction time in contact with the catalyst. It is therefore preferred that the feed flow rate should be such that the hydrocarbon effluent contains from 3 to 0.2 mol per cent, and preferably from 2 to about 0.5 mol per cent, ethylene. In the event other olefins having three or more carbon atoms per molecule are used instead of ethylene as alkylating reactants, similar conditions of temperature, pressure, flow rate and catalyst:hydrocarbon ratio may be employed, the specific conditions being readily chosen by one skilled in the art. This alkylation step is primarily operated as a continuous process in which the normal procedure is to continuously supply fresh catalyst to the system and continuously withdraw the corresponding amount of catalyst from the total mass of catalyst in order to maintain activity at a desired level. The portion withdrawn is customarily designated as "spent" catalyst but it is merely a part of the catalyst being used and is just as active. Ordinarily a large body of catalyst is maintained in a reactor or circulated into and out of the reactor and only a small portion withdrawn so that it may take hours or even days to replace the entire mass of catalyst with fresh make-up catalyst. The withdrawn portion of the catalyst is less active than the make-up catalyst but just as active as the catalyst in use. Inasmuch as it is passed to the aromatic alkylation step in alkylator 50 and/or to the alkyl chloride producing step in reactor 28 as make-up catalyst therefor, it is more active than the catalyst actually in use in those reactors. The catalyst thus withdrawn from the first alkylation reaction step and passed to the other steps has been modified in activity so that the catalyst used in the latter steps is not of such a high activity as would ordinarily be encountered were fresh aluminum chloride being used to supply make-up catalyst thereto. Accordingly, the selectivity of the reaction of propylene with HCl in reactor 28 is greatly improved, and also the catalyst activity within the alkylator 50 is quite adequate for effecting the reaction of isopropyl chloride with benzene therein.

Alkylator 50 may be similar to alkylator 74 in design, construction and operation. A liquid mixture of benzene with isopropyl chloride is contacted with the liquid aluminum chloride or other metal halide catalyst under conditions effective to produce the desired isopropyl benzene or cumene as the principal product of the reaction. These conditions include moderate temperatures, such as from about 0° C. and on up to 100° C. or somewhat higher. Total effluents of reactor 50 are passed via line 114 into separator 116 which is a diagrammatic representation of equipment which will readily be selected by one skilled in the art. In separation zone 116 the catalyst is settled out as a heavy liquid layer and is withdrawn via line 118 and valve 120, a portion being discarded from the system as spent catalyst and the balance being recycled to alkylator 50 by means not shown. A portion of the catalyst may be pased via valve 122 and lines 124 and 34 into reactor 28 for use as a catalyst for the isopropyl chloride-producing reaction as explained hereinbefore. Hydrogen chloride formed in the alkylator 50 by the reaction of isopropyl chloride with benzene is recovered as a gas and passed via valve 126 and lines 128 and 30 into reactor 28 for reuse as in forming isopropyl chloride by reaction with propylene. This stream of recycled HCl may be purified in known manner to remove inert light gases such as hydrogen or methane which tend to accumulate therein. Excess benzene is recovered via line 130 and valve 132 and recycled by means not shown to alkylator 50. Other light materials formed as by-products may be withdrawn from separation zone 116, as via line 130 or otherwise and discarded. Polyalkyl benzenes are separated through line 134 and valve 136 and may be discarded, used as such, or returned to alkylator 50 for dealkylation therein to produce additional monoalkyl benzene in the presence of the excess benzene in the reaction mixture. The primary alkylate, composed predominantly of isopropyl benzene (cumene) is recovered by way of line 138 and may either be passed through valve 140 and line 142 to storage or may be passed via line 144 and valve 146 into line 112 for blending with the diisopropyl to form an aviation fuel blending stock of high rich mixture and lean mixture anti-knock values.

While the invention has been described with particular reference to the selective reaction of hydrogen chloride with the propylene in an ethylene-propylene mixture, followed by reaction of the remaining ethylene plus residual hydrogen chloride with isobutane to form diisopropyl, the hydrogen chloride acting as activator for an aluminum chloride catalyst, it will be understood that the same principles are applicable, with suitable modifications of conditions readily apparent to one skilled in the art, to other mixtures of olefins having varying reactivities toward hydrogen chloride to form alkyl chlorides and to provide other olefins containing small quantities of hydrogen chloride for use in an alkylation reaction. Other hydrogen halides, particularly hydrogen bromide or hydrogen fluoride, may be used in place of hydrogen chloride, with suitable selection of catalyst and reaction conditions.

While the preferred reaction is ethylene with isobutane to form diisopropyl, the ethylene or other olefin may instead be reacted as any alkylatable hydrocarbon such as isopentane or even benzene or other alkylatable aromatic hydrocarbon, as well as alkylatable naphthenic hydrocarbons, in the presence of suitable metal halide catalysts activated with the controlled quantity of residual hydrogen halide present in the olefin stream.

The alkyl chloride or halide formed in the first reaction step of my process is preferably reacted with benzene as described, but it may instead be reacted within other alkylatable hydrocarbons of the paraffinic, naphthenic or aromatic series to produce valuable products which may or may not be blended with the product of the first alkylation step.

It will be appreciated that various changes may be made in the specific conditions and procedures discussed herein without departing from the scope of the invention as defined in the appended claims.

I claim:

1. A process for the preparation of an alkylate of high purity which comprises admixing with a mixture of two olefins of different reactivities toward hydrogen halides a predetermined controlled quantity of a hydrogen halide to react with the more reactive olefin, subjecting the resulting admixture to conditions effecting the selective reaction of hydrogen halide with said more reactive olefin to form the corresponding alkyl halide thereby forming a material enriched in the less reactive olefin, the aforesaid controlled quantity of hydrogen halide being sufficient to effect said formation of alkyl chloride and leave a small residual predetermined quantity of unreacted hydrogen halide in admixture with the unreacted olefin, the said small residual predetermined quantity of unreacted hydrogen halide in admixture with the unreacted olefin being that quantity which will activate the metal halide catalyst in the ensuing alkylation reaction between said alkylatable hydrocarbon and said olefin to form an alkylate rich in the primary alkylation product of said olefin and said alkylatable hydrocarbon according to prior art practice, recovering said unreacted olefin together with the said residual hydrogen halide and admixing same with an alkylatable hydrocarbon, contacting the last said admixture with a Friedel-Crafts type metal halide catalyst under conditions whereby said hydrogen halide activates said metal halide catalyst to act as an alkylation catalyst and said olefins reacts with said alkylatable hydrocarbon in the presence of the activated catalyst to form an alkylate rich in the primary alkylation product of said olefin and said alkylatable hydrocarbon.

2. A process for the preparation of diisopropyl alkylate of high purity which comprises admixing with a mixture of ethylene and propylene a predetermined controlled quantity of hydrogen chloride, subjecting the resulting admixture to conditions effecting the selective reaction of hydrogen chloride with propylene to form propyl chloride thereby removing substantially all the propylene and leaving substantially all the ethylene unreacted, the aforesaid controlled quantity of hydrogen chloride being sufficient to effect said formation of propyl chloride and leave a small residual predetermined catalyst-activating quantity of unreacted hydrogen chloride in admixture with the unreacted ethylene, the said small residual predetermined catalyst activating quantity of unreacted hydrogen chloride which is in admixture with the unreacted ethylene being that quantity which will activate the aluminum chloride catalyst in the ensuing alkylation reaction between ethylene and isobutane to form an alkylate rich in diisopropyl according to prior art practice, recovering said unreacted ethylene together with the said residual hydrogen chloride and admixing same with isobutane, contacting the last said admixture with an aluminum chloride catalyst under conditions whereby said hydrogen chloride activates said aluminum chloride catalyst to act as an alkylation catalyst and said ethylene reacts with said isobutane in the presence of the activated catalyst to form an alkylate rich in diisopropyl.

3. A process for the preparation of diisopropyl alkylate of high purity which comprises admixing with a mixture of ethylene and propylene a predetermined controlled quantity of hydrogen chloride, contacting the resulting admixture with an aluminum chloride-hydrocarbon complex catalyst derived as hereinafter described under conditions effecting the selective reaction of hydrogen chloride with propylene to form isopropyl chloride thereby forming a material enriched in ethylene, the aforesaid controlled quantity of hydrogen chloride being sufficient to effect said formation of isopropyl chloride and leave a small residual predetermined catalyst-activating quantity of unreacted hydrogen chloride in admixture with the unreacted ethylene, the said small residual predetermined catalyst activating quantity of unreacted hydrogen chloride which is in admixture with the unreacted ethylene being that quantity which will activate the aluminum chloride catalyst in the ensuring alkylation reaction between ethylene and isobutane to form an alkylate rich in diisopropyl according to the prior art practice, recovering said unreacted ethylene together with the said residual hydrogen chloride and admixing same with isobutane, contacting the last said admixture with an aluminum chloride-hydrocarbon complex catalyst under conditions whereby said hydrogen chloride activates said aluminum chloride catalyst to act as an alklation catalyst and said ethylene reacts with said isobutane in the presence of the activating catalyst to form an alkylate rich in diisopropyl, and passing catalyst which has been used in said diisopropyl-forming reaction for a substantial length of time so that it is no longer suitable to continue to catalyze said reaction, to contact with the aforesaid admixture of ethylene and propylene with hydrogen chloride as catalyst for said isopropyl chloride-forming reaction.

4. A process according to claim 3 in which isopropyl chloride is recovered, the thus recovered isopropyl chloride is reacted with benzene in an alkylation reaction to form cumene, said cumene is blended with said diisopropyl alkylate to form an aviation gasoline blending stock of high lean mixture and rich mixture anti-knock values, and catalyst which has been used in said diisopropyl-forming reaction for a substantial length of time so that it is no longer suitable to continue to catalyze said reaction, is passed to contact with said isopropyl chloride and benzene as catalyst for said cumene-forming reaction, and catalyst which has been used in the last said reaction is then used as catalyst for said isopropyl chloride-forming reaction.

5. A process according to claim 3 in which the total effluent from the isopropyl chloride-forming reaction is subjected to fractional distillation to form a single gas fraction containing said unreacted ethylene and said residual catalyst-activating quantity of hydrogen chloride, which fraction is admixed with isobutane as described.

JOHN D. UPHAM.

REFERENCES CITED

The following references are of record in the file of this patent:

UNITED STATES PATENTS

| Number | Name | Date |
| --- | --- | --- |
| 2,141,593 | Clarke et al. | Dec. 27, 1938 |
| 2,328,275 | Heard | Aug. 31, 1943 |
| 2,364,203 | Francis et al. | Dec. 5, 1944 |
| 2,393,895 | Fleming | Jan. 29, 1946 |
| 2,411,817 | Thompson et al. | Nov. 26, 1946 |
| 2,430,212 | Clarke et al. | Nov. 4, 1947 |
| 2,438,211 | Gorin et al. | Mar. 23, 1948 |
| 2,453,779 | Bond et al. | Nov. 16, 1948 |